United States Patent [19]

Merchuk et al.

[11] Patent Number: 5,503,748

[45] Date of Patent: Apr. 2, 1996

[54] SEQUENCING BATCH AIR-LIFT REACTOR AND METHOD FOR TREATING WASTEWATER

[76] Inventors: Jose C. Merchuk, P.O. Box 528, Metar 85025, Israel; Marc H. Siegel, 13672 Via Cima Bella, San Diego, Calif. 92129; Asher Brenner, P.O. Box 1156, Omer 84965, Israel

[21] Appl. No.: 110,279

[22] Filed: Aug. 20, 1993

[51] Int. Cl.$^6$ ............................................. C02F 3/20
[52] U.S. Cl. ................................ 210/629; 210/921
[58] Field of Search ............................ 210/620, 629, 210/921, 624

[56] References Cited

U.S. PATENT DOCUMENTS

| | | | |
|---|---|---|---|
| 4,279,754 | 7/1981 | Pollock | 210/629 |
| 4,351,730 | 9/1982 | Bailey et al. | 210/629 |
| 4,367,146 | 1/1983 | Pollock et al. | 210/629 |
| 4,407,718 | 10/1983 | Pollock | 210/629 |
| 4,425,231 | 1/1984 | Fujimoto et al. | 210/629 |
| 4,663,044 | 5/1987 | Goronszy | 210/624 |
| 5,395,527 | 3/1995 | Desjardins | 210/629 |

OTHER PUBLICATIONS

American Society of Civil Engineers (ASCE): A Standard for the Measurement of Oxygen Transfer in Clean Water. New York: ASCE (Jul. 1984).

W. Boyle, "Development of Standard Procedures for Evaluating Oxygen Transfer Devices," Report for USEPA, Cincinnati, Ohio (Oct. 1983).

A. Brenner, et al., "Treatment of a High-Strength, Mixed Phenolic Waste in an SBR," *Water Environment Research*, 64:128-133 (1992).

L. Gasner, "Development and Application of the Thin Channel Rectangular Air Lift Mass Transfer Reactor to Fermentation and Waste-Water Treatment Systems," *Biotechnology and Bioengineering*, 16:1179-1195 (1974).

P. Herzbrun, et al., "Biological Treatment of Hazardous Waste in Sequencing Batch Reactors," *Journal WPCF*, 57:1163-1167 (1985).

D. Hines, et al., "The ICI Deep Shaft Aeration Process for Effluent Treatment" Proceedings: Conference of the Institute of Chemical Engineers, York, England, Apr. 16-17, 1975.

L. Ketchum, et al., "A Comparison of Biological and Chemical Phosphorus Removals in Continuous and Sequencing Batch Reactors," *Journal WPCF*, 59:13-18 (1987).

J. Wanner, "Comparison of Biocenoses from Continuous and Sequencing Batch Reactors" *Wat. Sci. Tech.*, 25:239-249 (1992).

*Primary Examiner*—Thomas Wyse
*Attorney, Agent, or Firm*—Fulbright & Jaworski

[57] ABSTRACT

A batch wastewater treatment process using a novel sequencing batch air-lift reactor (SBALR) and upflow sludge blanket is described. The static Fill step of the sequencing batch process has an upflow feed of wastewater through an upflow sludge blanket element. This step is followed by Aerated React, Settle, and Draw steps, all of which steps are confined to the single reactor. Reactor performance is excellent with a mean COD removal rate of 99.6%, mean final effluent suspended solids of 4.9 mg/l, and sludge volume index of 67.2 ml/g. Gas hold-up and mass transfer coefficient over a range of suspended solids values are representative of conventional and high-rate activated sludge treatment processes, as well aerobic digesters. The SBALR reactor meets the oxygen demand needed for both the activated sludge and aerobic digestion process.

9 Claims, 4 Drawing Sheets

SEQUENCING BATCH AIR-LIFT REACTOR AND METHOD FOR TREATING WASTEWATER

FIELD OF THE INVENTION

The present invention relates generally to the field of wastewater treatment. More specifically, the present invention relates to a sequencing batch air-lift reactor for the treatment of wastewater and a novel process for using a sequencing batch air-lift reactor to treat wastewater.

BACKGROUND OF THE INVENTION

The air-lift reactor is a mechanically simple, combined gas-liquid flow device characterized by fluid circulation in a defined cyclic pattern through specifically designed channels. Fluid motion is due to the mean density difference in the upflow section, i.e., the riser and the downflow section, i.e., the downcomer. The air-lift reactor is comprised of distinct zones with different flow patterns. The riser is the zone where the gas is injected creating a fluid density difference. This zone exhibits cocurrent upward flow of both liquid and gas phases. At the top of the reactor is the gas-liquid separator section. This is a region of horizontal fluid flow and flow reversal where gas bubbles disengage from the liquid phase. The downcomer is the zone where the gas-liquid dispersion or degassed liquid recirculates to the riser. The downcomer zone exhibits either single-phase, two-phase cocurrent, or two-phase mixed cocurrent-countercurrent downward flow, depending on whether the liquid velocity is greater than the free-rise velocity of the bubbles. The base section at the lower end of the vessel communicates the exit of the downcomer to the entrance of the riser.

The air-lift reactor has been predominately utilized for microorganism fermentation processes and single-cell protein production. Little work has been done to develop a wastewater treatment process for the application of air-lift reactor technology. Examples of air-lift reactors developed for use as wastewater treatment processes include the Betz reactor (Gasner, L. L., 1974, Development and application of the thin channel rectangular air lift mass transfer reactor to fermentation and waste-water treatment systems. *Biotech. Bioeng.*, 16:1179–1195), and the I.C.I. "Deep Shaft" reactors (Hines et al., 1975, The ICI deep shaft aeration process for effluent treatment. *Inst. Chem. Eng. Sym. Ser. U.K.*, 41:D1–D10). However, continuous flow air-lift reactors generally are disadvantaged in the area of settling and bulking control, denitrification and phosphate removal without chemical addition and good oxygen transfer efficiency relative to other treatment mechanisms.

SEQUENCING BATCH REACTOR

The sequencing batch reactor is an activated sludge wastewater treatment system which operates by the process of batch or fill-and-draw steps. The sequencing batch reactor's process is based on discrete operation in time rather, in contrast to the air-lift reactor's process which is based on discrete operations in space. This is to say that in the sequencing batch reactor, if all the different steps of the process occur in the same reactor, they must occur at different times. Whereas, in conventional activated-sludge systems, a number of different steps of the process (e.g.: flow equalization, aeration and clarification) occur in the same vessel, but in different spaces or sections.

Sequencing batch reactors have five process steps which are carried out in sequence. The first is the Fill stage, where the raw influent is introduced into the reactor. The length and method (aerated, non-aerated mixed, and/or static) of the Fill stage will subsequently influence the microbial population and the treatment efficiency. The second is the React stage, where after the fill is completed, air is usually introduced into the reactor for a sufficient time period for the needed reactions to occur. The length of this stage will be dependent on the waste's characteristics and concentration of the biomass. Other types of operation (e.g. anoxic, anaerobic) can be applied during the React step to manipulate organism growth, population dynamics and contaminant transformations. The third is the Settle stage, where after the aeration is halted, the liquids-solids are separated. A sludge blanket settles on the bottom of the reactor leaving a treated effluent supernatant. The fourth is the Draw stage, where the treated effluent is discharged from the reactor. The fifth is the Idle stage, which is a time period between cycles (Draw and Fill).

The need for, or length of the Idle stage is dictated by the number of tanks being used and the flow rate of raw influent into the sequencing batch reactor system. In multi-tanks systems, Idle is needed if the Fill cycle has not completed in another tank. In fact, the general sequencing batch reactor process needs multiple vessels (tanks) in order for the process to be both sequential and batch. The need for multiple vessels is a disadvantage of the conventional sequencing batch reactor process.

A further disadvantage of the sequencing batch reactor is that they generally are horizontally spread out, and have a relatively large exposed surface area per overall reactor volume. This is particularly disadvantageous in wastewater treatment situations where off-gases must be collected and/or controlled (e.g. biodegradation and controlled stripping in volatile organic compounds). Because of the general horizontal aspect of the sequencing batch reactor, it cannot be built in areas with restricted space requirements. Also, the sequencing batch reactor requires a separate or additional power input for solids fluidization and mixing, other than that already provided for the aeration of the medium.

SUMMARY OF THE INVENTION

The object of the present invention is a sequencing batch air-lift reactor (SBALR) for treating domestic and industrial wastewater. A further object of the present invention is a method of using an SBALR for wastewater treatment. The present invention is capable of treating high strength domestic wastewaters and light industrial wastewaters.

The SBALR is an improvement over the current separate technologies of open-system aerobic digestion sequencing batch reactors and conventional continuous-flow, activated-sludge reactors, and is capable of meeting the oxygen demand needed for both processes. The SBALR has the advantage that it can be operated either as a continuous system or as a sequencing batch system. Further, the present invention combines the unique oxygen transfer capabilities of the conventional air-lift reactor with the kinetic advantages of the conventional sequencing batch reactor, with the addition of an upflow sludge blanket fill, to accomplish high removal rates of organics from wastewater in a relatively small process vessel while consuming less energy than the conventional sequencing batch reactor.

In a preferred embodiment, a Sequencing Batch Air-Lift Reactor for waste water treatment comprises an air-lift reactor with an enlarged gas-liquid separator. The enlarged gas-liquid separator allows for improved gas-liquid disengagement and increases the total reactor volume, as well as introduces improved flexibility in air-lift reactor process operation. Due to the improved gas-liquid disengagement in the enlarged separator, liquid circulation velocity, solids fluidization and mixing are consequently improved.

The object of the present invention of an SBALR having an enlarged gas-liquid separator is a novel geometry and major design modification which is distinguishable from the conventional air-lift reactor. The size of the enlarged gas-liquid separator can be manipulated depending on the desired use of the SBALR for waste treatment. For most industrial and domestic wastes you would want to maximize the volume in the liquid-gas separator to improve circulation velocity and mass transfer efficiency (in terms of volume of waste treated). This concept is a unique and new approach to wastewater treatment reactor design in that it focuses on the gas-liquid separator as a means of manipulating the process design and operation.

Another object of the present invention is a process to treat a volume of wastewater using an SBALR in combination with an "upflow sludge blanket". The term "upflow sludge blanket" defines a sludge blanket that forms in the bottom of the reactor as a part of the treatment process, which sludge blanket is fluidized from the bottom upward by the upflowing through it of the fluid to be treated during the filling of the reactor. The process comprises the steps of: filling an SBALR with wastewater in an upflow direction through an upflow sludge blanket (Fill step); aerating the wastewater and sludge blanket with gas (e.g., air or oxygen enriched air) to oxygenate and circulate the mixed liquid suspended solids (MLSS) in the SBALR (Aerate step); reacting the biomass in the MLSS within the SBALR (React step); settling the suspended solids to form and/or maintain a sludge blanket and clarified supernatant (Settle step); drawing off the clarified supernatant as treated wastewater (Draw step); and repeating the Fill through Draw steps for the sequential batch air-lift reactor process to treat the required wastewater stream.

A further object of the present invention is an SBALR and process that can be used in both "continuous" and "batch" modes of operation. The "continuous operation" process means that Fill, Aerate, React, Settle and Draw operations may all take place simultaneously. When the "continuous operation" process is applied to wastewater treatment, a different vessel for the settling operation may be required depending on the height of the riser, gas hold-up, influent/effluent rate and other parameters. The "batch" SBALR process comprises a static Fill stage of the reactor of wastewater through a sludge blanket, which remained in the reactor from the previous cycle. This was followed by Aerated React, Settle, and Draw stages. All stages are confined to the volume of the single SBALR reactor, and occur in sequence. If many batches are processed, this becomes a cycle. The SBALR adapts the classical batch operation to wastewater treatment by adding a settling stage (in the same vessel) before the emptying of the reactor (Draw period). This allows drawing clarified water from the upper part of the reactor.

DETAILED DESCRIPTION OF THE INVENTION

In the preferred embodiment, a sequencing batch mode of operation is used in an air-lift reactor in combination with an upflow sludge blanket to provide a self-contained device and method of wastewater treatment. An advantage of the SBALR as a batch reactor is that it is self-contained and has a vertical geometry, as opposed to a conventional batch wastewater treatment facilities with a horizontal geometry. The SBALR exploits its vertical geometric structure to form a deep sludge blanket at the bottom of the reactor by sedimentation of the flocculated sludge (biomass) at the end of each cycle. The wastewater of the following cycle is passed in an upflow direction through the accumulated biomass of the sludge blanket. This upflow sludge blanket aspect of feeding the reactor enables waste absorption and some biodegradation in the biomass floc of the sludge blanket during the Fill stage. The absorbed substrate from the feed is then in intimate contact with the biomass of the sludge blanket at the onset of the Aerated-React stage.

Figure 1:
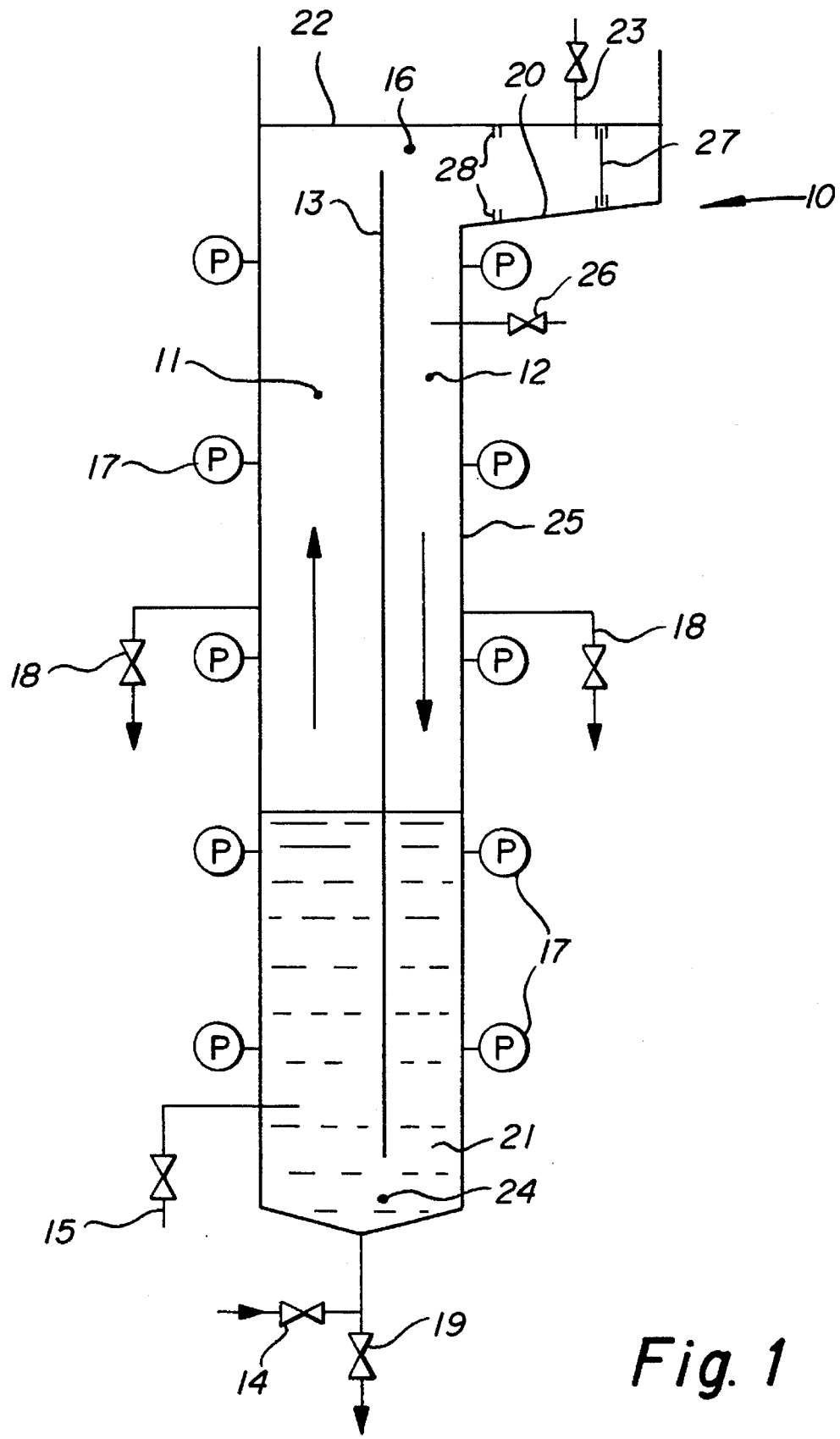
FIG. 1 is a schematic representation of a Sequencing Batch Air-Lift Reactor.

A sequencing batch air-lift reactor 10 is shown in FIG. 1. The reactor includes a vessel 25 the interior of which is separated into an upflow-side called the riser 11 and a downflow-side called the downcomer 12, separated by a baffle 13. The SBALR has a gas-liquid separator section 16 where gas and liquid phases may separate, and a crossover section 24 where fluid from the downflow-side downcomer enters the upflow-side riser. Liquid to be treated is introduced into the reactor through the feed inlet 14 located at the bottom of the crossover section 24 of the vessel 25. A gas, such as air, oxygen or nitrogen, is injected via one or more sparger tubes 15 located inside the vessel, adjacent the side wall of the riser section 11 in the vicinity above the lower end of the riser 11. Auxiliary sparger tubes 26 are located at the upper end of the vessel 25 below the entrance of the downcomer, and are used in very tall SBALRs or in the case of processes with high oxygen demand. The vessel 25 has a gas-liquid separator 16 with an enlarged cross-section relative to the riser 11 plus downcomer 12 cross-sections, and a sloped floor 20 on the downcomer side 12 as a means of avoiding dead spaces or unmixed volumes and preventing the accumulation of solids on the downcomer side of the reactor. Further, the volume of gas-liquid separator may be varied by inserting a removable partition 27 into a partition holder 28, such as slotted receptacles.

During operation, the level of the liquid-gas mixture in the SBALR is maintained at a level above the upper end of the baffle 13 separating the riser 11 and downcomer 12. The gas-liquid separator can be open or fitted with a cover 22. The off-gases from the gas-liquid separator can be recovered by fitting the separator cover 22 with a valve 23 through which off-gases can be collected and/or controlled (e.g., removal of volatile compounds, or control of biodegradation), as well as enabling head pressure control to enhance mass transfer. Ports 17 for draining or sampling are located at intervals along the length of the riser 11 and downcomer 12. The effluent should be withdrawn simultaneously from both riser and downcomer outlets 18. Effluent withdrawal can also be accomplished by decanting mechanisms or pumps located in the riser and downcomer, if gravity flow is impractical in a particular application. The vessel 25 also has a main drain port 19 for complete emptying or other uses, such as removal of accumulated biomass solids (wasting of sludge).

In operation, all of the steps or stages of the SBALR process occur in the volume of the single SBALR reactor. The first step of a SBALR "batch" process comprises a static Fill stage where fluid to be treated is fed into the bottom of the SBALR using valves installed in the feed line 14 to control the flow rate. In this step, the fluid to be treated passes upwards through the upflow sludge blanket 21 which remained in the vessel 25 from the previous cycle. The incoming fluid expands the blanket of settled flocculated sludge during the filling process. At start-up, the SBALR may be charged with a biomass (such as activated sludge from another reactor) before the initial Fill step, or the biomass for the process can be contained in the initial wastewater of the first Fill step.

In the Aerate step, spargers 15 introduce a gas into the fluid to be treated in the riser section of the reactor. Aerating the wastewater and sludge blanket 21 with gas disperses the blanket and forms a mixed liquor suspended solids with the wastewater and circulates it through the vessel 25. Additionally, the gases cause a decrease in density of the mixed liquor in the riser, relative to the downcomer. This density differential is the driving force of liquid circulation.

During the React step, the organisms of the biomass in the mixed liquor suspended solids within the SBALR react with the waste, usually in combination with oxygen in the gas. In very tall SBALRs or in the case of processes with high oxygen demand, auxiliary spargers 26 can be located in the entrance of the downcomer section, aerating in a downward direction. Auxiliary spargers aerate at a significantly lower rate than the riser spargers, in order to maintain the necessary density differentials (difference in hydrostatic pressures) between riser and downcomer.

In the Settle step, sedimentation of the suspended solids forms and maintains the upflow sludge blanket 21, and a clarified supernatant. At the cessation of aeration, a large fluffy floc forms which settles rapidly into a compact sludge blanket at the bottom of the reactor.

In the Draw step, discharge of the clarified supernatant from the vessel as treated wastewater occurs. The effluent is drawn simultaneously from ports 18 located on the riser and downcomer.

In the Repeat step, repeating the Filling through the Drawing steps provides for the sequential batch air-lift reactor treatment of wastewater. In the repeat Fill steps, the Fill wastewater is passed through the upflow sludge blanket formed in the previous cycle of the sequencing batch process.

Nomenclature g=gravitational acceleration (cm/s$^2$)
$H_L$=degassed liquid height above sparger (m)
$K_L a$=overall mass transfer coefficient (1/h)
p=pressure (mm H$_2$O)
P=isothermal power of gas expansions (W)
P/VL=isothermal power of gas expansion per degassed liquid volume (kW/m$^3$)
$Q_G$=volumetric gas flow rate, STP (cm$^3$/s)
z=distance between manometer measuring ports (mm)
ρ=density (kg/m$^3$)

Sequencing Batch Air-Lift Reactor Construction

An SBALR (10) was constructed of transparent polyvinylchloride (PVC), and having a rectangular cross-section. A schematic of the reactor is shown in FIG. 1. The liquid volume in the reactor was maintained at 200 L. The main dimensions (cm) of the reactor were: riser (11), 9×25×400; downcomer (12), 7×25×400; gas-liquid separator (16), 57×25×60. The downcomer-to-riser cross-sectional area ratio (AD/AR) was 0.78, and the geometric aspect ratio was 19.5. The aspect ratio was based on the riser and downcomer height (neglecting the liquid level in the gas-liquid separator) and the equivalent diameter of the reactor (2ab/{a+b}, where a and b are the sides of the cross-section of the reactor). The reactor in this example had an unconventional rectangular cross-section (of the rise and downcomer). More conventional geometries of air-lift reactors, such as concentric tube reactors and circular cross-section split-vessel type air-lift reactors could also be fitted with enlarged gas-liquid separators and used in a like manner.

Sequencing Batch Air-Lift Reactor Operation

A synthetic waste solution was prepared in fresh 120 L batches and the SBALR was gravity fed by means of a feed inlet valve installed in the feed inlet line (14) to control the flow rate. The waste passed upwards through the settled sludge blanket (21) remaining in the reactor from the previous cycle, and expanded the blanket from 75 to 125 cm depth after settle to 150 to 250 cm during the filling process. The cycle times of the sequencing batch (or Fill and Draw) mode of operation and the main operation parameters during steady state operation of the reactor are summarized in Table 1.

TABLE 1

| Main Operations Parameters of SBALR Process | |
|---|---|
| Maximum Reactor Liquid Volume (L) | 200 |
| Feed Volume per Cycle (L) | 120 |
| Cycles per Day | 3 |
| Hydraulic Retention Time (days) | 0.56 |
| Aerobic Residence time (daily aeration (time) (days) | 0.38 |
| Organic Load (adjusted to aeration time) (gCOD/gMLSS.d) | 1.07 |
| Cycle Times: Static Fill (h) | 0.5 |
| Aerated React (h) | 5.5 |
| Settle (h) | 1.0 |
| Draw (h) | 1.0 |
| Total Cycle Time (h) | 8.0 |

Gas was injected into the riser section 11 via two sparging tubes 15 located adjacent to the 25 cm width side walls of the riser 11, and 10 cm above the riser entrance. The spargers consisted of two simple tubes, the gas delivery ends of which had fifty 0.05 cm diameter holes drilled along the length of the tube at regular intervals (holes facing downward). The gas flow rate was maintained at a riser superficial gas velocity (influent gas flow rate divided by the riser cross sectional area) of 1.34 cm/s (standard temperature and pressure, STP) throughout the wastewater treatment experiments. The level of the gas-liquid fluid was maintained at 15 cm above the upper end of the baffle 13 separating the riser 11 and downcomer 12. The total liquid volume in the gas-liquid separator 16 was approximately 44.6 L. Drain and sample ports 17 were located at 50 cm intervals along the length of the riser and downcomer. The final effluent was drawn simultaneously from effluent ports 18 located at the midpoint of the riser and downcomer. The 120 L of final effluent were removed from the reactor during each cycle.

The synthetic waste used to feed the reactor consisted of a mixture of organic compounds and essential nutrients. The main components of the synthetic wastewater contributing to the 1050 mg/L COD were 110 grams of D(−) fructose and 10 grams of casein hydrolysate per batch. Table 2 lists the components of the synthetic wastewater per 120 L batch.

TABLE 2

| Composition of Synthetic Fluid | |
|---|---|
| Component | Mass (grams) |
| D(-) Fructose | 110.00 |
| Casein hydrolysate | 10.00 |
| Urea (38.2% nitrogen) | 25.89 |
| $Na_2HPO_4.7H_2O$ | 22.62 |
| $KH_2PO_4$ | 11.99 |
| $FeSO_4.6H_2O$ | 1.60 |

Sequencing Batch Air-Lift Reactor Operational Analysis & Monitoring

The dissolved oxygen (DO) in the fluid, the oxygen uptake rate (OUR), and mass transfer coefficient ($K_La$) were measured using a polarographic oxygen probe (Yellow Springs Instruments, combination Probe 5739 with standard membrane) connected to a microprocessor for continuous data collection. The mass transfer coefficient in the wastewater was determined according to the procedure established by the American Society of Civil Engineers (Boyle, 1983). The DO probe was attached to a stainless steel tube which held the electrode inside the downcomer, 0.5 m from the entrance. The electrode was held in an inverted position (membrane facing upward) to eliminate gas bubble entrapment on the membrane surface.

The overall volumetric mass transfer coefficient was determined by a physical dynamic nitrogen-air step change method. The oxygen in the vessel was first depleted by degassing with nitrogen gas. The oxygen concentration in the liquid phase of the fluid was measured as a function of time after a step change from nitrogen to air in the influent gas. The gas flow was uninterrupted during the switch from nitrogen to air so that consistent fluid dynamic conditions would be maintained in the air-lift throughout the determination. This process was repeated for the different gas flow rates for all experimental conditions. Response curves were analyzed assuming perfect mixing in both the gas and the liquid phases. The lag in the electrode response due to oxygen electrode dynamics was considered using a first-order response model (Siegel and Merchuk, 1986). Mass transfer coefficients were standardized to standard conditions at 20° C. according to the American Society of Civil Engineers: *A Standard for the Measurement of Oxygen Transfer in Clean Water*. New York, 1984.

In the 200 L SBALR used in these examples, the aeration efficiency was in the range of 2.5 to 6.0 kg $O_2$/kW.h in clean water determinations, depending on operation regime and geometric configuration of the gas-liquid separator. Unlike aeration towers and agitated tanks, the aeration efficiency remained relatively constant with increasing power input.

The local gas hold-up was measured by a system of 1.5 meter inverted differential manometers, and manometer measurements were made in millimeters of water. One end of the manometer tubes was connected to a manifold, which was connected to a reference point on the air-lift. The other end of each manometer was attached to sampling ports on the air-lift by flexible polymer tubing. The ports at each level were connected so that an average pressure across the cross-section was read. The pressure taps were located at 0.5 m intervals along the length of the riser and downcomer, starting at 0.5 m from the end of the central baffle. The local gas hold-up was calculated as:

$$\phi=(P_n-P_{n-1})/z$$

where $\phi$=local gas hold-up p=local pressure reading (manometer) at height n z=distance between points n and n−1

The sectional gas hold-up in the riser and downcomer was calculated as the mean gas hold-up in the section, based on the local gas hold-up measurements. The gas hold-up in the gas-liquid separator was based on a weighted average of the local gas hold-up at the exit of the riser and the entrance of the downcomer. The overall reactor gas hold-up was a weighted average of the sectional gas hold-ups in the three sections of the reactor with relation to each section's volume to that of the whole reactor.

The pneumatic power of the gas input, P, was calculated as that due to isothermal expansion of the gas:

$$P=(g)(\rho_L)(Q_G)(H_L)$$

where:

g=gravitational acceleration $\rho_L$=liquid density $Q_G$=volumetric gas flow rate (STP)

$H_L$=degassed liquid height above sparger

In regard to wastewater treatment efficiency, the main parameters analyzed were filtered COD (feed, effluent and time dependent), reactor MLSS, oxygen uptake rate, effluent suspended solids, and sludge volume index. All analyses were performed according to the American Public Health Association: *Standard Methods for the Examination of Water and Wastewater.* 16th Ed., Washington, 1985.

SBALR Treatment of Domestic Wastewater

Figure 2:
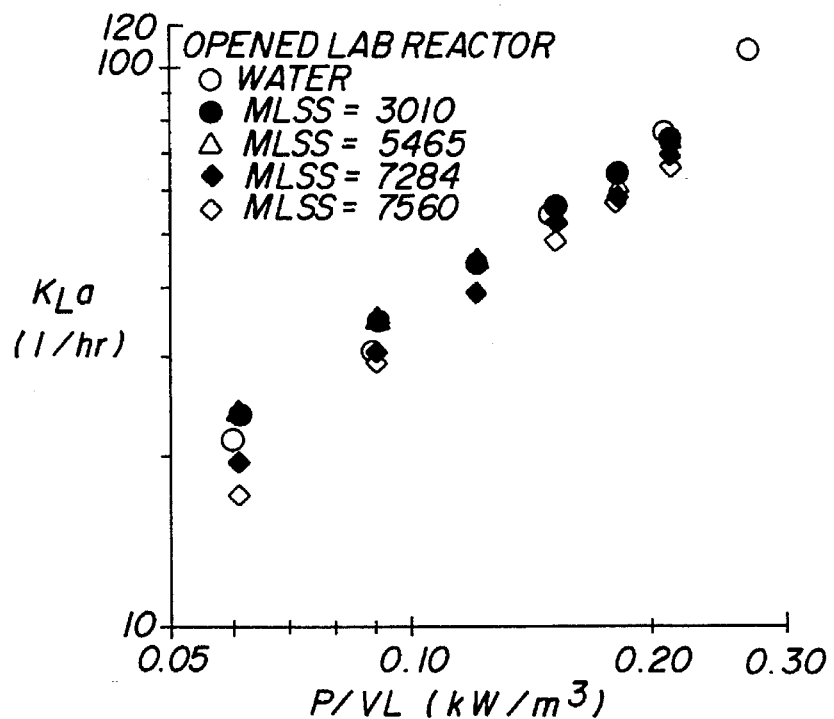
FIG. 2 is a graph of the effect of mixed liquor suspended solids concentration on the overall mass transfer coefficient.
Figure 3:
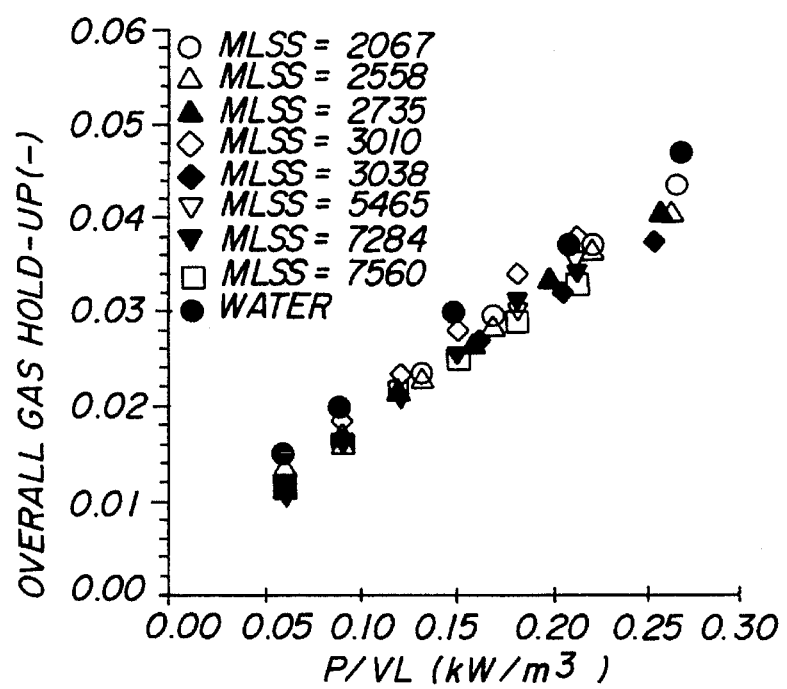
FIG. 3 is a graph of the effect of mixed liquor suspended solid concentration on overall gas hold-up.

FIG. 2 shows the determination $K_La$ (in terms of liquid volume) for the treatment of domestic wastewater in a respiring biological system. The determination was made after the system had reached a stage of endogenous respiration. Endogenous respiration was confirmed by oxygen uptake rate (OUR) and dissolved oxygen (DO) tests during the mass transfer determinations. For all gas flow rates, with the exception of the lowest flow rate examined, DO saturation was reached within less than ten minutes of the step change. This indicates significant excess of DO in the reactor for the respiring system, and the high capacity of the system for delivering oxygen to the medium. The influence of biomass (MLSS) concentration on the measured $K_La$ is not significant. It should be noted that the MLSS concentrations represented in this figure reached high values which were more typical of pure oxygen activated sludge processes and aerobic sludge digesters than conventional activated sludge processes. This indicates that the SBALR can provide the oxygen requirements of high organic loading activated sludge systems, as well as conventional aerobic sludge digestion processes. A potential strategy for optimizing the operation the SBALR process as a compact, on-site wastewater treatment system would be to operate the reactor at high biomass concentration, which allows smaller reactor volumes for a given waste load. The fact that even at the highest MLSS concentrations, $K_La$ remained high indicates that SBALRs warrant examination as potential reactors in autothermal aerobic thermophilic sludge digesters. There is no significant influence of biomass (MLSS) concentration on the overall gas hold-up in the reactor for MLSS concentrations ranging from 2067 mg/L to 7560 mg/L, as shown in FIG. 3.

The main performance parameters during steady state operation of the reactor are summarized in Table 3.

TABLE 3

Performance of Air-Lift Reactor Treatment Process

| Parameter | Mean | Standard Deviation |
|---|---|---|
| Reactor MLSS (mg/L) | 2557.5 | 125.0 |
| Filtered COD After Fill (mg/L) | 217.7 | 24.8 |
| Effluent Filtered COD (mg/L) | 4.5 | 4.6 |
| Effluent Suspended Solids (mg/L) | 4.9 | 1.9 |
| Sludge Volume Index (mL/gMLSS) | 67.2 | 1.4 |

SBALR Operational Performance Analysis

Figure 4:
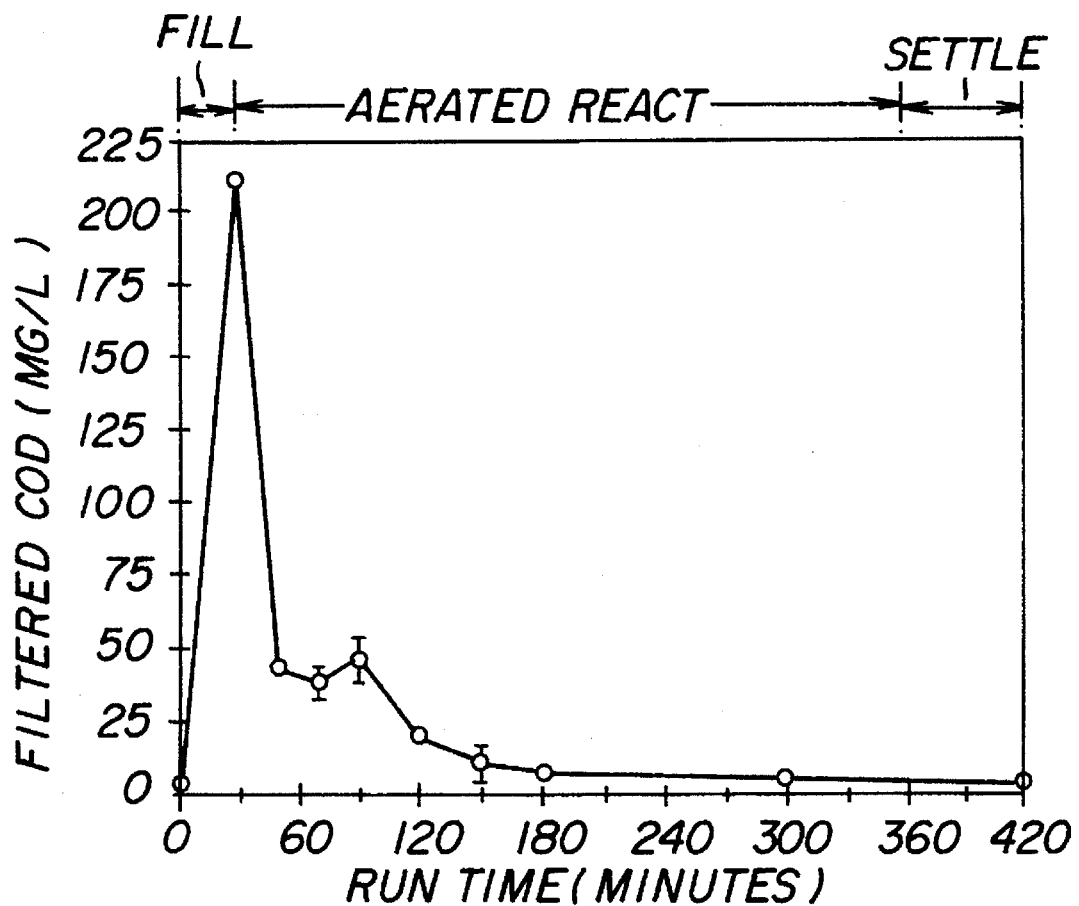
FIG. 4 is a graph of the chemical oxygen demand (COD) over the time course of a run.

The mean COD removal efficiency of the sequencing batch air-lift reactor process was 99.6%. The reduction in the filtered COD concentration in the reactor as a function of time during a cycle is shown in FIG. 4. There was already a 65% reduction in the COD, based on total reactor volume, after just the Fill cycle. This reduction in COD was predominately due to COD absorption into the flocs during the upflow through the expanded sludge blanket, and supports the utility sludge blanket as an element of the present invention. A COD removal of 97%, based on total reactor volume, resulted in a mean filtered COD of 20.3 mg/L, after only 1.5 hours of aeration. The slight increase in COD after 60 minutes of aeration may be due to the release of soluble secondary products into the solution after the rapid uptake of the organisms of the readily available carbon source.

Figure 5:
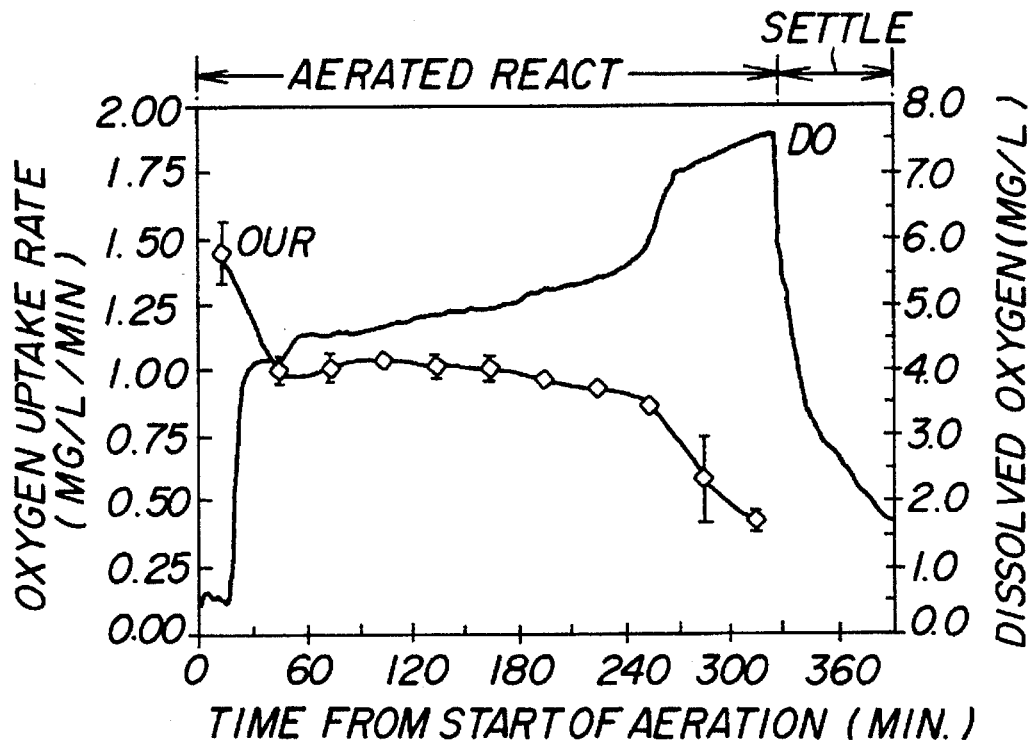
FIG. 5 is a composite graph showing the oxygen uptake rate (OUR) and dissolved oxygen concentration (DO) over time.

FIG. 5 is a graph of the oxygen uptake rate and a typical dissolved oxygen profile during the aeration stage. Immediately after aeration commences, the oxygen demand of the microorganisms was at its greatest. FIGS. 4 and 5 clearly indicate that there was no substrate inhibition using the readily available fructose (in contrast to substrate inhibition seen in many industrial waste systems). As the substrate in the reactor was rapidly depleted, the oxygen demand likewise decreased to a plateau, which was reflected in both the oxygen uptake rate and DO in the liquid. As the substrate concentration in solution as well as the floc was depleted the oxygen uptake rate will subsequently decreased leading to an increase in the liquid DO, until saturation DO level was approached. The DO concentration was maintained well above the approximately 2.0 mg/L needed in typical activated sludge systems. Therefore, the SBALR could potentially be operated at reduced air flow rates without adversely effecting treatment efficiently.

Figure 6:
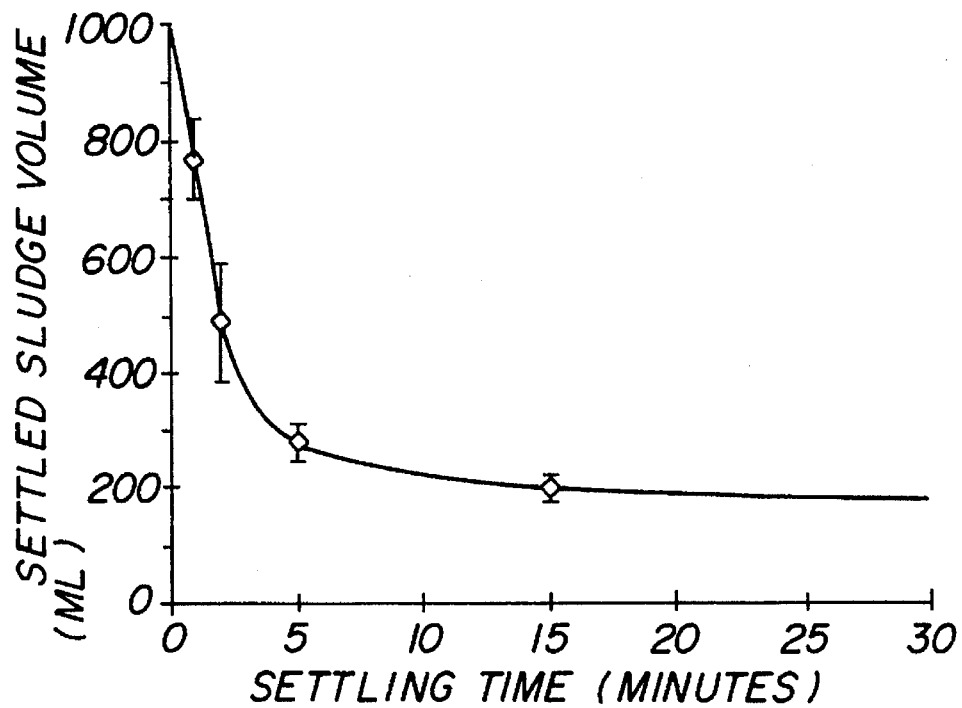
FIG. 6 is a graph showing sludge volume as a function of time after cessation of aeration.

At the cessation of aeration, a large fluffy floc was formed which settled rapidly into a compact sludge blanket at the bottom of the reactor. FIG. 6 shows the settled sludge volume as a function of time after the cessation of aeration. After only five minutes of the Settle cycle, the sludge volume index was less than 110 ml/gMLSS. At the end of the Settle cycle the sludge blanket in the bottom of the reactor compacted down to a 75 to 125 cm depth. A very clear supernatant remained above the settled sludge blanket, as evidenced by the low effluent suspended solids concentration (<5.0 mg/L) after the Settle step. A microscopic examination of the wastewater at the time of cessation of aeration showed a healthy microorganism population with the presence of protozoa and rotifers, and an absence of free filamentous organisms.

This Example demonstrates the capability of the upflow sludge blanket SBALR as a wastewater treatment reactor and process. A very high quality effluent was obtained for the synthetic wastewater mixture that was tested. A mean COD removal efficiency of 99.6% was achieved, with 97% removal within 2 hours of treatment cycle (Fill and Aerate). The SBALR's high oxygen transfer capability was easily able to meet the oxygen demand of the biomass, indicating that higher organic loads may be treated as well. FIGS. 4 and 5 also indicate that the aeration period can potentially be reduced and the number of daily cycles increased.

Gas-Liquid Separator

The device of the present invention has an element novel to air-lift reactors specific for wastewater treatment. The enlarged gas-liquid separator geometry is a major design element of the SBALR which distinguishes it from conventional air-lift reactors.

This is especially useful if the enlarged gas-liquid separator is coupled with the "Channel-Loop" concept. This embodiment being the attachment of an open channel-loop to the top of the air-lift reactor. One end of the loop is connected to the riser and the other end of the loop is connected to the downcomer, to serve as the gas-liquid separator, utilizing the air-lift as the driving force for liquid circulation and aeration in the open channel.

The size of the enlarged gas-liquid separator can be manipulated depending on the desired use of the SBALR for waste treatment. For most industrial and domestic wastes you would want to maximize the volume in the liquid-gas separator to improve circulation velocity and mass transfer efficiency (in terms of volume of waste treated). For waste treatment processes where off gases must be collected and/or controlled, a smaller, covered gas-liquid separator is preferred.

In a preferred embodiment, as practiced on the reactor of these examples, it is desirable that the volume of the gas-liquid separator to be changed by means of removable partitions. Such partitions have the advantage of enabling manipulation of the operating conditions for different process considerations, such as liquid circulation velocities, oxygen mass transfer and gas recirculation. The object of using the gas-liquid separator as an element for manipulating wastewater treatment processes is new to air-lift reactor design, and is a completely unique to the present invention for wastewater treatment.

The optimal gas-liquid separator size and configuration for the desired gas disengagement depends on the time for a gas bubble to disengage from the liquid. The amount of time required for a gas bubble to disengage or the fraction of gas bubbles which disengage at any time is dependent on the free rise velocity of the bubble, the liquid velocity (of the liquid which is carrying the bubble) in the gas-liquid separator, and the horizontal distance which the bubble must travel. Enlarging the gas-liquid separator can influence gas-liquid separation in various ways. Increasing the cross-sectional area for fluid flow decreases the liquid velocity allowing more time for bubble disengagement. Increasing the length of the flow path allows more time for the bubble to rise in the liquid and disengage. The optimum gas-liquid separator size is a combined function of both the fluid flow cross-sectional area and the length of the flow path. Our research has also shown that the "waterfall effect" of gas and liquid overflowing the central baffle between the riser and downcomer (entraining gas into the downcomer) can be avoided by maintaining the degassed liquid level above the central baffle so that the cross-sectional area for fluid flow is equal to or greater than the cross-sectional area of the riser. This allows for the development of horizontal flow in the gas-liquid separator and more efficient separation of the gas. It should be noted that the "waterfall effect" can be enhanced by lowering the degassed liquid level in the gas-liquid separator of the airlift, allowing gas to be entrained into the downcomer. Lowering the degassed liquid level to equal to, or less than, the top of the baffle separating the riser and downcomer significantly increases gas entrainment into the downcomer, decreases liquid circulation velocity and may cause instability in fluid flow.

SBALR Comparison With Conventional Sequential Batch Reactors

Table 4 shows that the SBALR gives equal or better performance as the best stirred tanks based systems. It should be noted that the SBALR could have been operated 4 cycles instead of 3, without loss in efficiency, which would have reduced the residence time to 0.42 days. The unique oxygen transfer capabilities of the air-lift reactor, combined with the kinetic advantages of the sequencing batch processing and with the flexibility gained by adding the upflow sludge blanket Fill step, results in the SBALR having high removal rates of organics in a relatively small process vessel while consuming less energy.

TABLE 4

| Comparison of Sequencing Batch Reactors vs. the SBALR | | | | | | |
|---|---|---|---|---|---|---|
| Reference | Reactor | time (days) | Wastewater | Influent (mg/L) | effluent (mg/L) | % removal |
| 1 | Stirred Tank | 8 | Industrial | 1100 (TOC) | 260 (TOC) | 76 |
| 2 | Stirred Tank | 0.8 | Municipal | 162 (BOD) | 6 (BOD) | 96.3 |
| 3 | Stirred Tank | 0.5 | Synthetic (C) | 1000 (COD) | 60 (COD) | 94 |
| 4 | Stirred Tank | 4.8 | Synthetic (Ph) | 2350 (TOC) | 20 (TOC) | 99.1 |
| Present | SBALR | 0.56 | Synthetic (C) | 1050 (COD) | 4.5 (COD) | 99.6 | time = Hydraulic residence time (reactor volume divided by the daily flow rate)?
C = Hydrocarbons
BOD = Biological Oxygen Demand
Ph = Phenolic
TOC = Total Organic Carbon
References for Table 4:
1 - Herzbrun et al., J. Water Pollution Control Federation, 57, 1163, 1985
2 - Ketchum et al., J. Water Pollution Control Federation, 59, 13, 1987
3 - Wanner, Water Science and Technology, 25, 239, 1992
4 - Brenner et al., Water Enforcement Research, 64, 128, 1992

While the above description contains many specificities, these should not be construed as limitations on the scope of the invention, but rather as exemplification of one preferred embodiment thereof. Other variations are possible, which would be obvious to one skilled in the art. Accordingly, the scope of the invention should be determined by the scope of the appended claims and their legal equivalents, and not just by the embodiments.

What is claimed is:

1. A process for treating wastewater in a sequencing batch air-lift reactor comprising the steps of:
    filling the reactor with said wastewater;
    aerating said wastewater with a gas to form and circulate a mixed liquor suspended solids in the reactor;
    reacting the mixed liquor suspended solids and the wastewater within said reactor;
    settling the suspended solids to form an upflow sludge blanket at the bottom of the reactor and a clarified supernatant above the sludge blanket; and
    drawing off the clarified supernatant as treated wastewater.

2. The process for treating wastewater according to claim 1, wherein the steps are performed sequentially in a batch operation mode.

3. The process for treating wastewater according to claim 1, further comprising the step of repeating the filling through drawing steps for the sequential batch treatment of said wastewater, wherein said wastewater of the filling step passes through said upflow sludge blanket.

4. The process for treating wastewater according to claim 1, wherein said filling step further comprises introducing said wastewater from the bottom of the reactor.

5. The process for treating wastewater according to claim 1, wherein said filling step further comprises:
    introducing said wastewater from the bottom of the reactor; and
    passing said wastewater upwards through said upflow sludge blanket.

6. The process for treating wastewater according to claim 1, wherein the filling step is preceded by the step of charging the reactor with an initial biomass.

7. The process for treating wastewater according to claim 1, wherein said reacting step further comprises reacting the gas with the mixed liquor suspended solids and the wastewater.

8. The process for treating wastewater according to claim 1, wherein the gas is injected into a lower end of the reactor.

9. The process for treating wastewater according to claim 1, wherein the effluent is drawn off from above the sludge blanket.

* * * * *